(12) United States Patent
Patton et al.

(10) Patent No.: US 11,096,481 B2
(45) Date of Patent: Aug. 24, 2021

(54) MOTORIZED ADJUSTABLE HEIGHT TABLE

(71) Applicant: Varidesk, LLC, Coppell, TX (US)

(72) Inventors: David Patton, Flower Mound, TX (US); Lio Y. Chang, Lewisville, TX (US)

(73) Assignee: VARIDESK, LLC, Coppell, TX (US)

( * ) Notice: Subject to any disclaimer, the term of this patent is extended or adjusted under 35 U.S.C. 154(b) by 0 days.

(21) Appl. No.: 16/047,246

(22) Filed: Jul. 27, 2018

(65) Prior Publication Data

US 2019/0029413 A1 Jan. 31, 2019

Related U.S. Application Data

(60) Provisional application No. 62/538,411, filed on Jul. 28, 2017.

(51) Int. Cl.
| | |
|---|---|
| *A47B 9/20* | (2006.01) |
| *A47B 13/00* | (2006.01) |
| *A47B 13/02* | (2006.01) |
| *A47B 3/06* | (2006.01) |
| *F16B 12/52* | (2006.01) |

(52) U.S. Cl.
CPC ............... *A47B 9/20* (2013.01); *A47B 3/06* (2013.01); *A47B 13/003* (2013.01); *A47B 13/021* (2013.01); *A47B 13/023* (2013.01); *F16B 12/52* (2013.01); *A47B 2200/0057* (2013.01); *A47B 2200/0059* (2013.01)

(58) Field of Classification Search
CPC ........... A47B 21/02; A47B 21/04; A47B 9/16; A47B 9/00; A47B 9/20; A47B 2200/004; A47B 2200/0066; A47B 13/081; A47B 13/088; A47B 13/003; A47B 2200/056; A47B 2200/0062; A47B 2200/0057; A47B 2200/0059; A47B 3/0911; A47B 17/02; A61G 7/012
USPC ................................. 108/20, 147; 312/223.1
See application file for complete search history.

(56) References Cited

U.S. PATENT DOCUMENTS

| | | | |
|---|---|---|---|
| 6,601,933 B1 * | 8/2003 | Greenwald | H05K 7/1489 312/330.1 |
| 7,382,623 B2 * | 6/2008 | Hartman | H05K 7/1421 211/162 |

(Continued)

FOREIGN PATENT DOCUMENTS

| | | | |
|---|---|---|---|
| CA | 2778652 | * | 12/2012 |
| CN | 10798540 | * | 5/2018 |

(Continued)

OTHER PUBLICATIONS

WO2019149296 Bucquetetal abstract and figure (Year: 2018).*

(Continued)

*Primary Examiner* — Janet M Wilkens
(74) *Attorney, Agent, or Firm* — Venable LLP; Michele V. Frank (57) ABSTRACT

A table includes a table top having a frame attached to a lower surface of the table top. The table also includes a first leg having lugs and a second leg having lugs. The lugs of the first leg and the second leg are received in slots of the frame to attach the legs to the table. The legs are telescopically movable to adjust the height of the table top.

21 Claims, 8 Drawing Sheets

(56) References Cited

U.S. PATENT DOCUMENTS

| | | | |
|---|---|---|---|
| 7,513,581 B1* | 4/2009 | Baiza | A47B 88/427 |
| | | | 312/319.1 |
| 8,403,433 B2* | 3/2013 | Chen | A47B 88/43 |
| | | | 312/333 |
| 8,807,500 B2* | 8/2014 | Han | G11B 33/124 |
| | | | 248/200 |
| 8,967,054 B2* | 3/2015 | Henriott | A47B 13/06 |
| | | | 108/50.02 |
| 9,271,567 B2* | 3/2016 | Wu | A47B 3/002 |
| 9,703,278 B2* | 7/2017 | Kristensen | G05B 15/02 |
| D819,378 S * | 6/2018 | Lin | D6/709 |
| 10,004,326 B2* | 6/2018 | Randlov | A47B 9/20 |
| 10,258,150 B2* | 4/2019 | Lin | A47B 17/02 |
| 10,588,401 B1* | 3/2020 | Lu | A47B 9/04 |
| 2011/0168064 A1* | 7/2011 | Jahnsen | A47B 9/00 |
| | | | 108/147 |
| 2012/0304900 A1 | 12/2012 | Henriott et al. | |
| 2014/0336822 A1* | 11/2014 | Kristensen | G05B 15/02 |
| | | | 700/275 |
| 2015/0282605 A1* | 10/2015 | Wu | A47B 3/002 |
| | | | 248/188.2 |
| 2017/0135466 A1* | 5/2017 | Randlov | A47B 9/20 |
| 2017/0303679 A1* | 10/2017 | Tseng | A47B 9/04 |
| 2018/0177288 A1* | 6/2018 | Lin | A47B 9/04 |
| 2018/0184788 A1* | 7/2018 | Binding | A45F 3/14 |
| 2019/0125072 A1* | 5/2019 | Tseng | A47B 13/021 |
| 2019/0254418 A1* | 8/2019 | Ryholl | A47B 9/04 |
| 2021/0100355 A1* | 4/2021 | Jorgensen | A47B 9/20 |

FOREIGN PATENT DOCUMENTS

| | | | |
|---|---|---|---|
| DE | 10 2008 010669 A1 | | 8/2009 |
| DE | 202011003743 | * | 6/2011 |
| EP | 2 926 688 A1 | | 10/2015 |
| EP | 3257401 | * | 12/2017 |
| EP | 2160958 | * | 7/2019 |
| WO | 2015/180723 A1 | | 12/2015 |
| WO | 2019174686 | * | 9/2019 |
| WO | 2019242061 | * | 12/2019 |
| WO | 2020041943 | * | 3/2020 |

OTHER PUBLICATIONS

CN 108813946 Feng et al abstract and figure (Year: 2018).*
CN 107713329 Wang abstract and figure (Year: 2018).*
English translation for CN107981540 (Year: 2018).*
Extended European Search Report issued in counterpart European Patent Application No. 18186011.5 dated Jan. 11, 2019.
Office Action issued in counterpart European Patent Application No. 18186011.5 dated Oct. 8, 2019.
Office Action issued in counterpart European Patent Application No. 18186011.5 dated Apr. 1, 2020.
European Communication of Intent to Grant for corresponding EP Application No. 18186011.5 dated Sep. 24, 2020.

* cited by examiner

MOTORIZED ADJUSTABLE HEIGHT TABLE

CROSS-REFERENCE TO RELATED APPLICATIONS

This application claims priority to U.S. Provisional Patent Application No. 62/538,411, filed Jul. 28, 2017, which is hereby incorporated by reference in its entirety.

TECHNICAL FIELD OF THE INVENTION

The present application relates to an adjustable height table. More specifically, the present application relates to an adjustable height table having telescoping legs which are electrically controlled to provide for table height adjustments.

BACKGROUND

Current motorized tables include table legs which must be coupled to the table top for example, via fasteners using tools. The motorized tables further require connection to a power source, such as a wall outlet. This connection may cause a trip hazard and limit the location of placement of the table. Thus, a need exists for a table that may be easily and quickly assembled, both with respect to assembly of the legs and connection to a power supply.

SUMMARY

According to an embodiment, a table may include a table top including an upper surface and a lower surface; a frame attached to the lower surface, the frame including a power supply, a first slot, and a second slot; a first leg including a first housing, the first housing including a first lug; and a second leg including a second housing, the second housing include a second lug. The first lug may be adapted to engage the first slot to secure the first leg to the table top and the second lug may be adapted to engage the second slot to secure the second leg to the table top.

According to an embodiment a table may include a table top including an upper surface and a lower surface; a frame attached to the lower surface, the frame including a first lateral frame member having a first slot and a second lateral frame member having a second slot; and a first leg including a first lug and a second lug. To secure the first leg to the table top, the first lug may be adapted to engage the first slot and the second lug may be adapted to engage the second slot.

According to an embodiment, a method for assembling a table may include providing a table top including an upper surface and a lower surface; attaching a frame to the lower surface of the table top, the frame including a power supply, a first slot, and a second slot; attaching a first leg to the frame by guiding a first lug on a first housing of the first leg into the first slot; attaching a second leg to the frame by guiding a second lug on a second housing of the second leg into the second slot; providing a first motor in the first housing and a second motor in the second housing; attaching a first power connection from the power supply to a first motor connection from the first motor; and attaching a second power connection from the power supply to a second motor connection from the second motor.

BRIEF DESCRIPTION OF DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF THE INVENTION

Embodiments of the invention are discussed in detail below. In describing embodiments, specific terminology is employed for the sake of clarity. However, the invention is not intended to be limited to the specific terminology so selected. A person skilled in the relevant art will recognize that other equivalent parts can be employed and other methods developed without departing from the spirit and scope of the invention. All references cited herein are incorporated by reference as if each had been individually incorporated.

Figure 1:
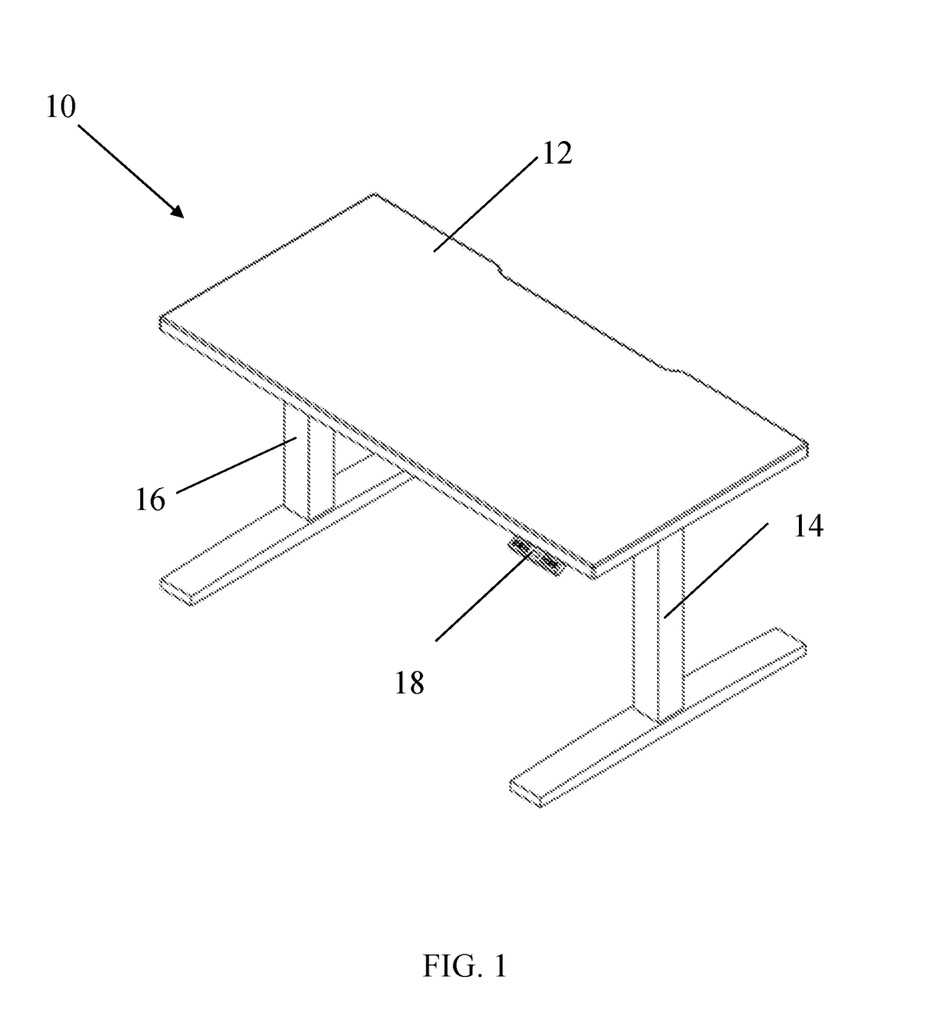
FIG. 1 is a perspective view of an adjustable height table from above, according to an embodiment.

Referring to FIG. 1, an embodiment of a table 10 according to the present invention is shown. The table 10 may include a table top 12, a first leg 14, and a second leg 16. The first leg 14 and the second leg 16 may be connected to a lower surface of the table top 12, as will be described herein. The table 10 may include a control panel 18. The control panel 18 may operate as a user interface for controlling the height of the table top 12. The control panel 18 may actuate the legs 14, 16 to move linearly to raise and lower the level of the table top 12.

Figure 2:
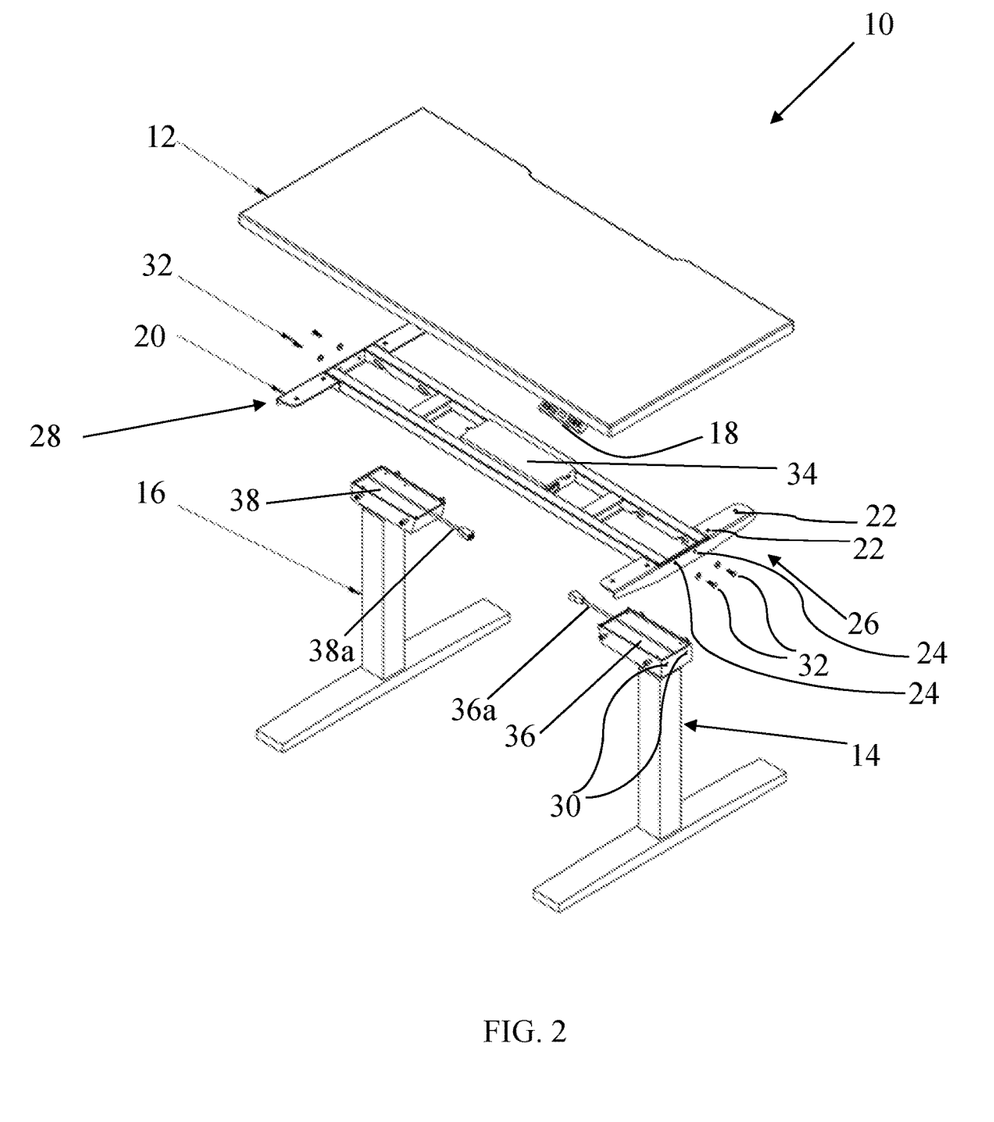
FIG. 2 is an exploded view of the adjustable height table of FIG. 1.

Referring to FIG. 2, an exploded view of the table 10 is shown. The table 10 may include a frame 20. The frame 20 may include holes 22 for attaching to the lower surface of the table top 12. The holes 22 may align with holes on the lower surface of the table top 12 and fasteners may extend through the holes 22 and the holes on the lower surface of the table top 12 to attach the frame 20 to the table top 12. The frame 20 may also include holes 24 on each of a first end 26 and a second end 28 of the frame 20. The holes 24 may align with holes 30 located on each of the first leg 14 and second leg 16. Fasteners 32 may extend through holes 24 and 30 to attach the first leg 14 to the first end 26 of the frame 20. Additional fasteners 32 may extend through holes 24 and 30 to attach the second leg 16 to the second end 28 of the frame 20. The fasteners 32, and other fasteners described herein, may be screws, quarter turn screws, snap pins, bolts, etc. Although eight holes 22 and four holes 24 are depicted and described, any number of holes 22 and 24 may be provided to secure the frame 20 to the table top 12 and to secure legs 14, 16 to the frame 20. The number of fasteners provided in holes 22 and 24 may correspond to the number of holes provided. The frame 20 may also include a power supply 34 for powering motors 36, 38 located in legs 14, 16, respectively.

Figure 3A:
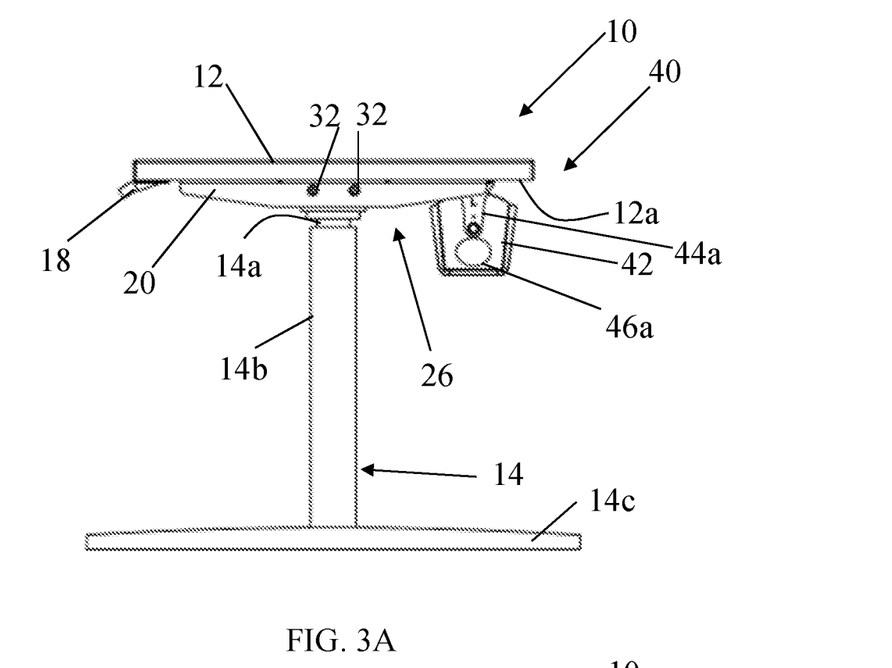
FIG. 3A is a side view of a first side of the adjustable height table of FIG. 1.

Referring to FIG. 3A, a first side 40 of the table 10 is shown. The first end 26 of the frame 20 may be secured to a lower surface 12a of the table top 12 at the first side 40 of the table 10. The control panel 18 may be secured to the lower surface 12a of the table top 12 at the first side 40 of the table 10. In the first end 26, there may be secured the first leg 14 via fasteners 32. The first leg 14 may comprise inner leg 14a and outer leg 14b, such that the inner leg 14a may move linearly within the outer leg 14b to adjust the height of the table top 12. The inner leg 14a may move telescopically within the outer leg 14b. The first leg 14 may also comprise a base 14c for supporting the inner leg 14a, outer leg 14b, table top 12, and frame 20. The motor 36 (FIG. 2) may actuate the inner leg 14a to move longitudinally upward and downward with respect to the base 14c, as will be described herein. The table 10 may include basket 42. The basket 42 may be attached to the frame 20 with a first bracket 44a. The basket 42 may include a first aperture 46a. The first aperture 46a may allow for cables, wires, and the like to be routed to or from the table 10 and may allow the cables, wires, and the like to be received within basket 42.

Figure 3B:
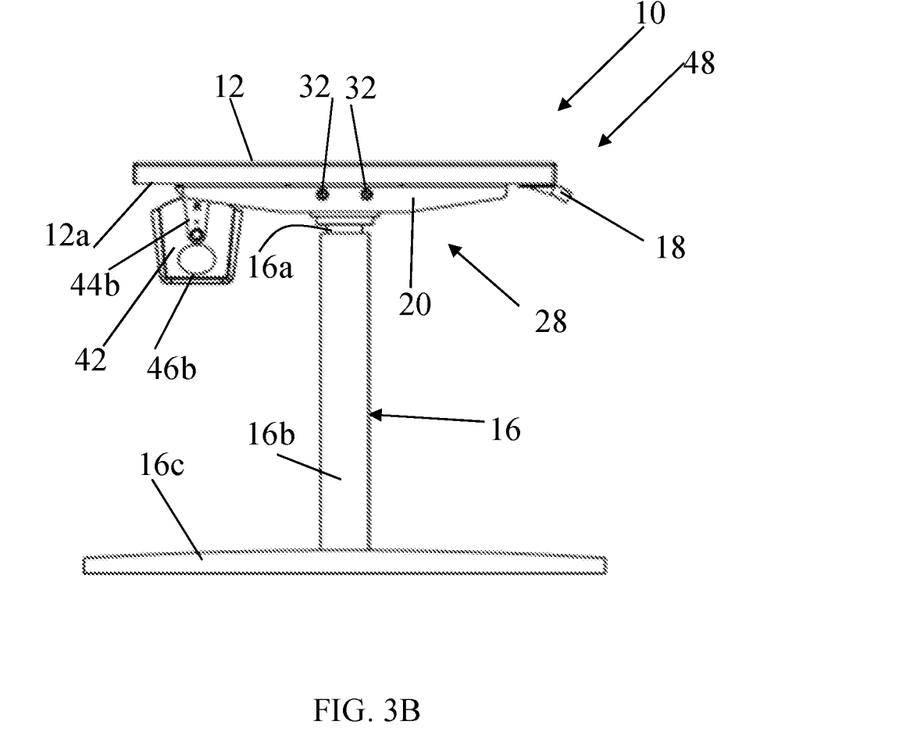
FIG. 3B is a side view of a second side of the adjustable height table of FIG. 1.

Referring to FIG. 3B, a second side 48 of the table 10 is shown. The second end 28 of the frame 20 may be secured to the lower surface 12a of the table top 12 at the second side 48 of the table 10. In the second end 28, there may be secured the second leg 16 via fasteners 32. The second leg 16 may comprise inner leg 16a and outer leg 16b, such that the inner leg 16a may move linearly within the outer leg 16b to adjust the height of the table top 12. The inner leg 16a may move telescopically within the outer leg 16b. The second leg 16 may also comprise a base 16c for supporting the inner leg 16a, outer leg 16b, table top 12, and frame 20. The motor 38 (FIG. 2) may actuate the inner leg 16a to move longitudinally upward and downward with respect to the base 16c, as will be described herein. The basket 42 may be attached to the frame 20 with a second bracket 44b. The basket 42 may include a second aperture 46b. The second aperture 46b may allow for cables, wires, and the like to be routed to or from the table 10 and may allow the cables, wires, and the like to be received within basket 42.

Figure 4A:
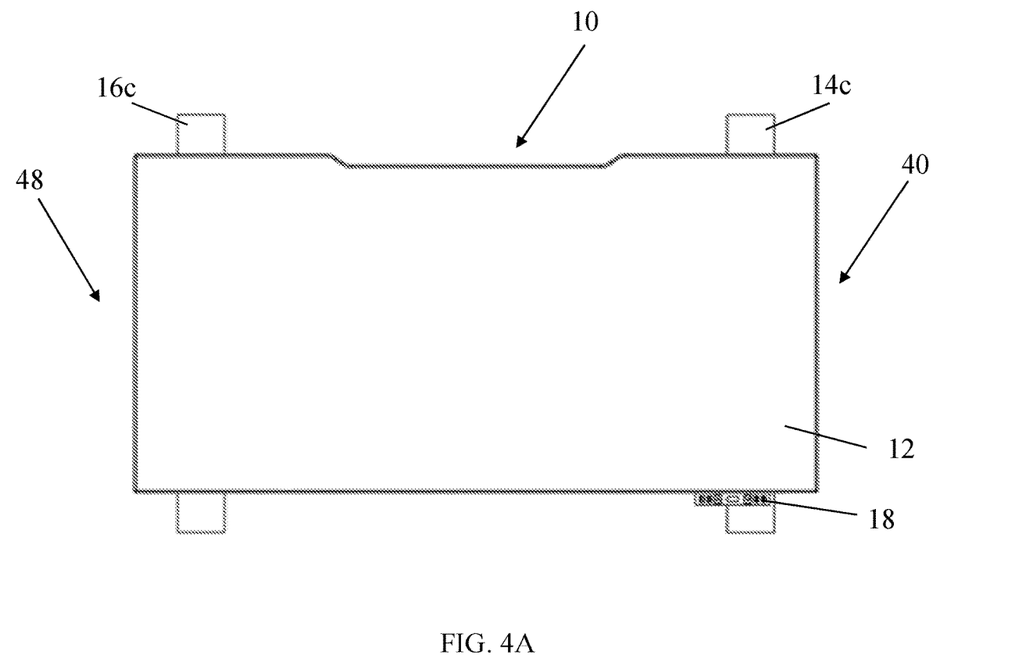
FIG. 4A is a top view of the adjustable height table of FIG. 1.
Figure 4B:
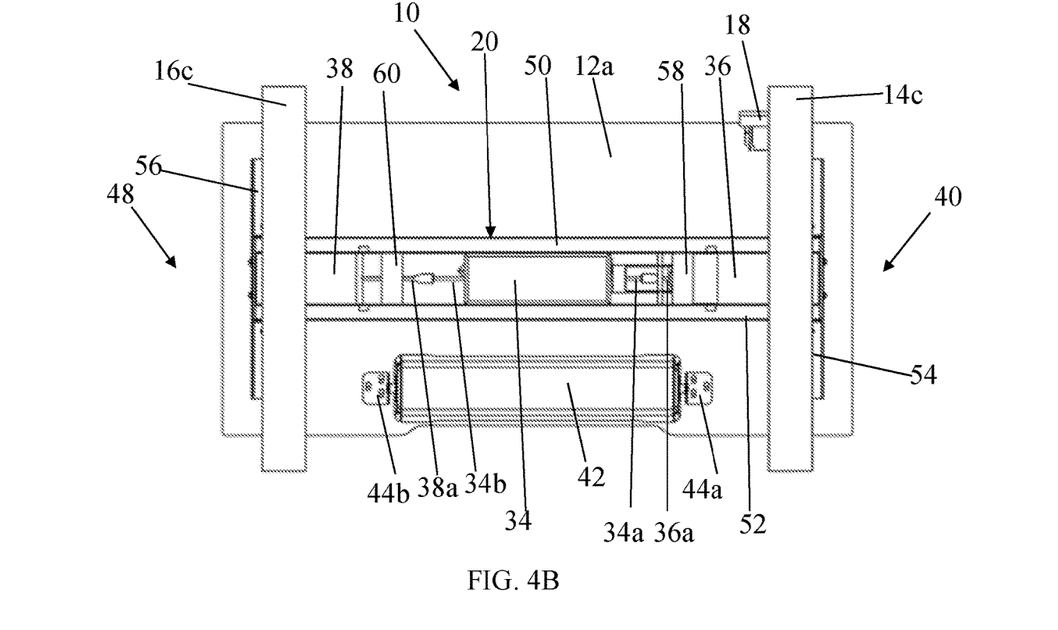
FIG. 4B is a bottom view of the adjustable height table of FIG. 1.

Referring to FIG. 4A, a top view of the table 10 is shown. The base 14c of the first leg 14 and the base 16c of the second leg 16 may have a length greater than the width of the table top 12. Although, a length less than or equal to the width of the table top 12 is also contemplated. Referring to FIG. 4B, a bottom view of the table 10 is shown. The frame 20 may include a first lateral frame member 50 and a second lateral frame member 52. The first lateral frame member 50 and second lateral frame member 52 may each be secured at either end to an end frame member 54 and an end frame member 56. The first lateral frame member 50 and the second lateral frame member 52 may be spaced apart by first spacer frame member 58 and second spacer frame member 60. The distance between the first and second lateral frame members 50, 52 may be selected to accommodate the motors 36, 38 and/or the power supply 34, however, other spacings are possible. A connection 34a of the power supply 34 may be connected to a connection 36a of the motor 36. A connection 34b of the power supply 34 may be connected to a connection 38a of the motor 38. The connections 34a, 34b, 36a, and 38a, may allow for the power supply 34 to supply power (e.g. AC or DC current) to the motors 36, 38 to actuate the linear movement of the table legs 14, 16.

With continued reference to FIG. 4B, more or fewer frame members may be provided to the frame 20. For example, the first spacer frame member 58 may be replaced with two spacer frame members. A first of the two spacer frame members may by located at the same or similar location as the first spacer frame member 58 depicted in FIG. 4B, however it may couple only the top surface of the first and second lateral frame members 50, 52 (e.g. the surface of the frame members 50, 52 adjacent the lower surface 12a). A second of the two spacer frame members may be located closer to the power supply 34. The second of the two spacer frame members may couple the lower surface of the first and second lateral frame members 50, 52 (e.g. the surface of the frame members 50, 52 facing away from the lower surface 12a). The second of the two spacer frame members may include a hole and a thread. A similar substitution of two spacer frame members may be provided for the second spacer frame member 60. Other additions or modifications to the frame members of frame 20 are contemplated.

Figure 5A:
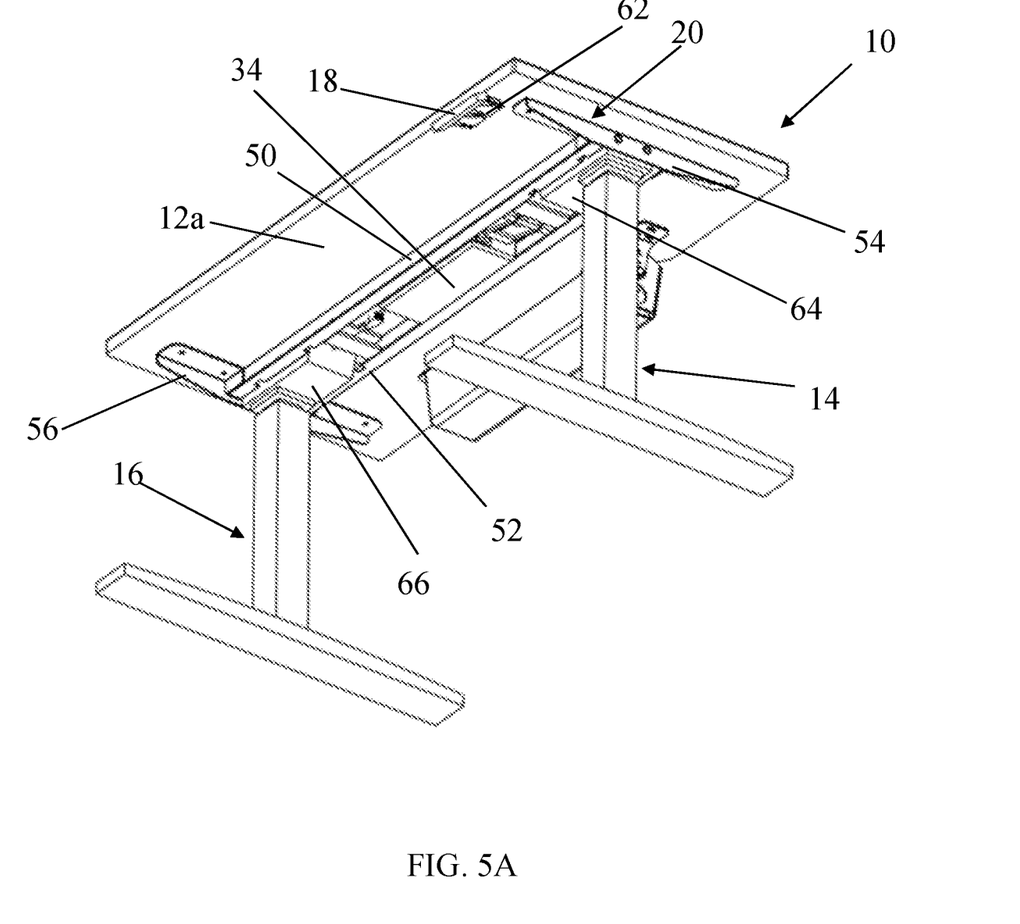
FIG. 5A is a perspective view of the adjustable height table of FIG. 1, from below.
Figure 5B:
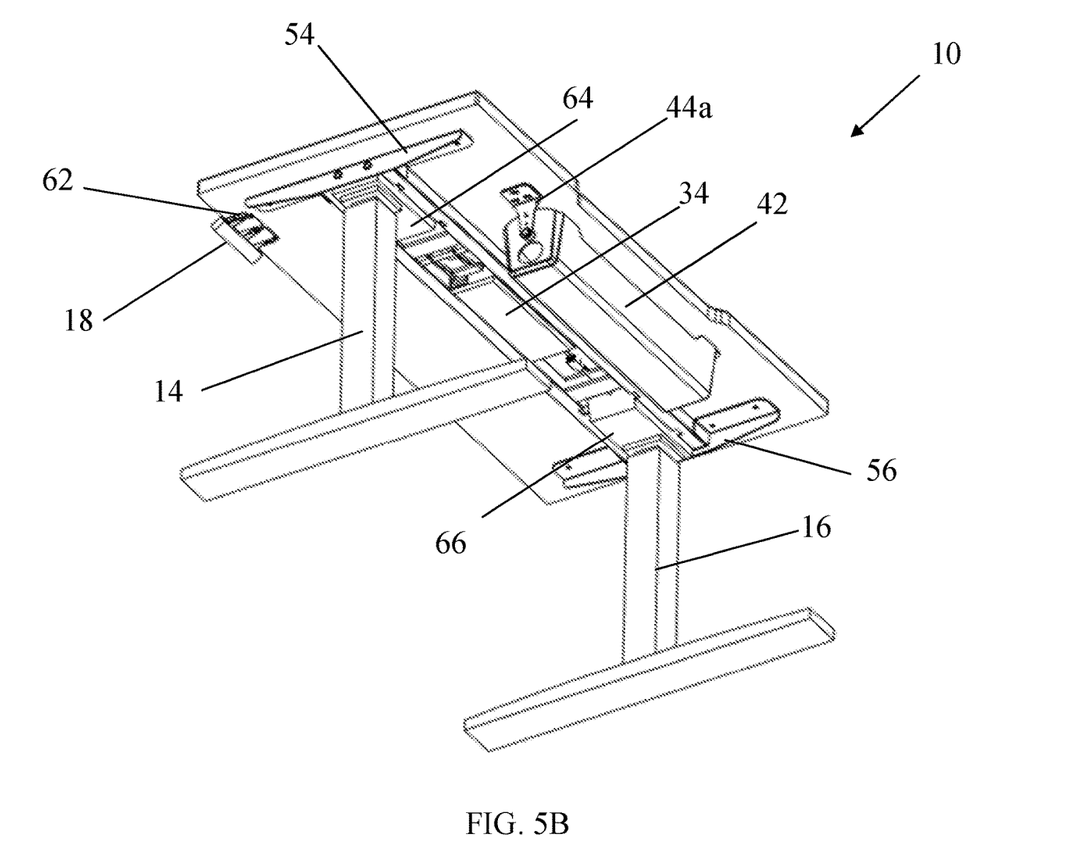
FIG. 5B is a perspective view of the adjustable height table of FIG. 1, from below.

Referring to FIGS. 5A and 5B, bottom isometric views of the table 10 are shown. The control panel 18 may be secured to the lower surface 12a of the table top 12 with a bracket 62. The motors 36 and 38 may be located within motor housings 64 and 66, respectively, attached to the inner legs 14a and 16a, respectively. The motor 36 may move the inner leg 14a linearly to raise and lower the table top 12. The motor 38 may move the inner leg 16a linearly to raise and lower the table top 12. The motors 36, 38 may move the inner legs 14a, 16a by actuation of a screw drive, worm drive, bevel, gear, cam, wheel and axle, belt and chain, etc. The motors 36, 38 may operate to raise the inner legs 14a, 16a and table top 12 in a level manner.

Figure 6A:
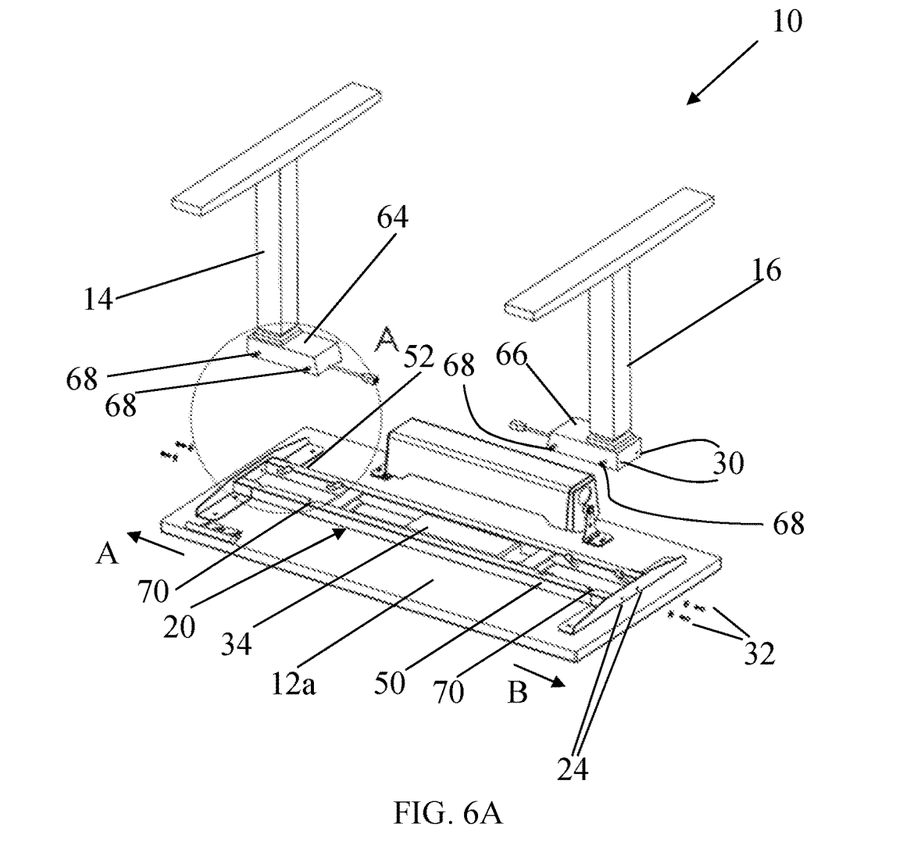
FIG. 6A is a perspective view of the bottom of the adjustable height table of FIG. 1.
Figure 6B:
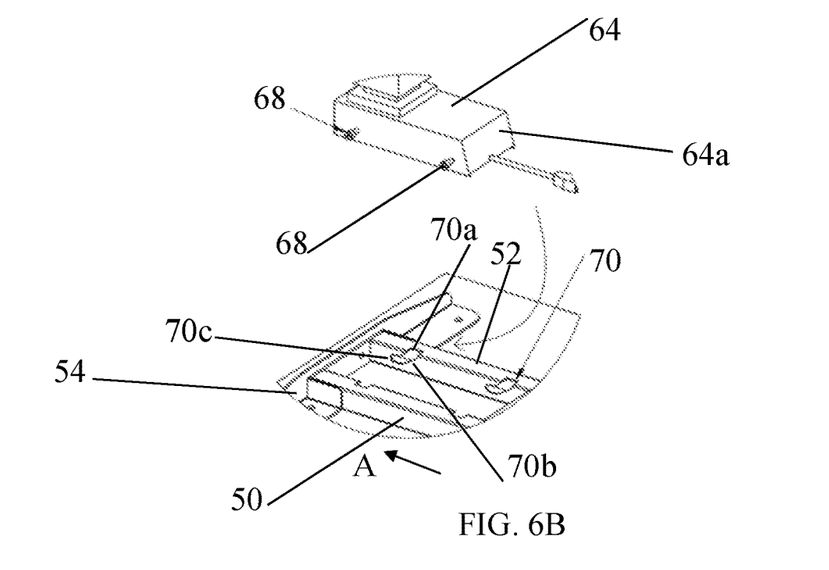
FIG. 6B is a detail view of a connection between a leg and table top of the adjustable height table of FIG. 1.

Referring now to FIGS. 6A and 6B, assembly of the table 10 may be understood. First, the table top 12 is placed on a level surface, such as the floor, with the lower surface 12a facing up. The frame 20 comprising frame members 50, 52, 54, 56, 58, and 60 may be assembled with fasteners, adhesives, welding, bonding, or the like. Alternatively, the frame 20 may be provided as a single, unitary piece, such as by casting, molding, machining, or the like. The holes 22 of the frame 20 may be aligned with holes (not shown) located in the lower surface 12a. The frame may be secured to the lower surface 12a of the table top 12 via fasteners (not shown) located in the aligned holes. The first leg 14 and the second leg 16 may be provided with lugs 68. Although two lugs are depicted in FIGS. 6A and 6B, two lugs 68 may also be provided on the opposing side of the motor housings 64 and 66. Alternatively, any number of lugs 68 may be provided.

With continued reference to FIGS. 6A and 6B, the lugs 68 may be provided on opposing side surfaces of the motor housings 64 and 66. The lugs 68 may be aligned with slots 70 in the first and second lateral frame members 50, 52. Although four slots 70 are depicted, any number of slots 70 may be provided and the number of slots 70 may correspond to the number of lugs 68 provided. The slot 70 may comprise three portions, a first portion 70a, a second portion 70b, and a third portion 70c. To secure the leg 14 to the table top 12, the leg 14 may be lowered such that the lugs 68 align with the first portions 70a of the slots 70. As the leg 14 is lowered, the lugs 68 will be guided along the first portions 70a and second portions 70b. When the lugs 68 are located at the end of the second portions 70b, there may be a small gap between the motor housing 64 and the end frame member 54. The leg 14 may not be fully engaged and secured to the table top 12. The leg 14 may not be fully engaged and secured in the slot 70 until a force is exerted on a surface 64a of the motor housing 64 in the direction of arrow "A". The force may move the motor housing 64 toward the end frame member 54 to close the gap and engage the lugs 68 in the third portions 70c of the slots 70. The second leg 16 may be installed in the same manner, aligning the lugs 68 with their respective slots 70 and providing a force on the motor housing 66 in the direction of arrow "B" as described with respect to first leg 14.

Figure 7:
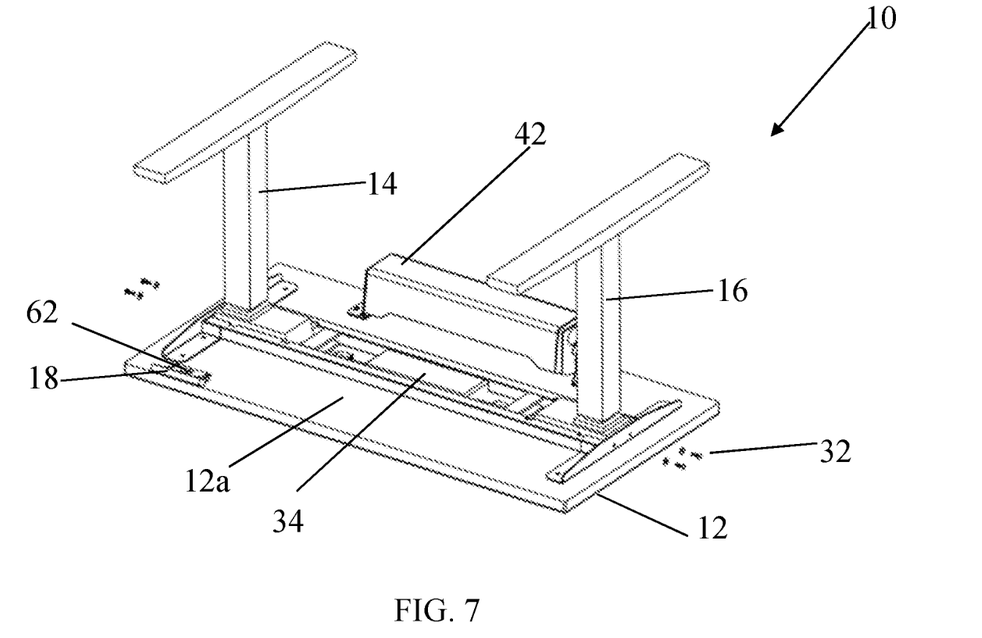
FIG. 7 is a perspective view of the bottom of the adjustable height table of FIG. 1.
Figure 8:
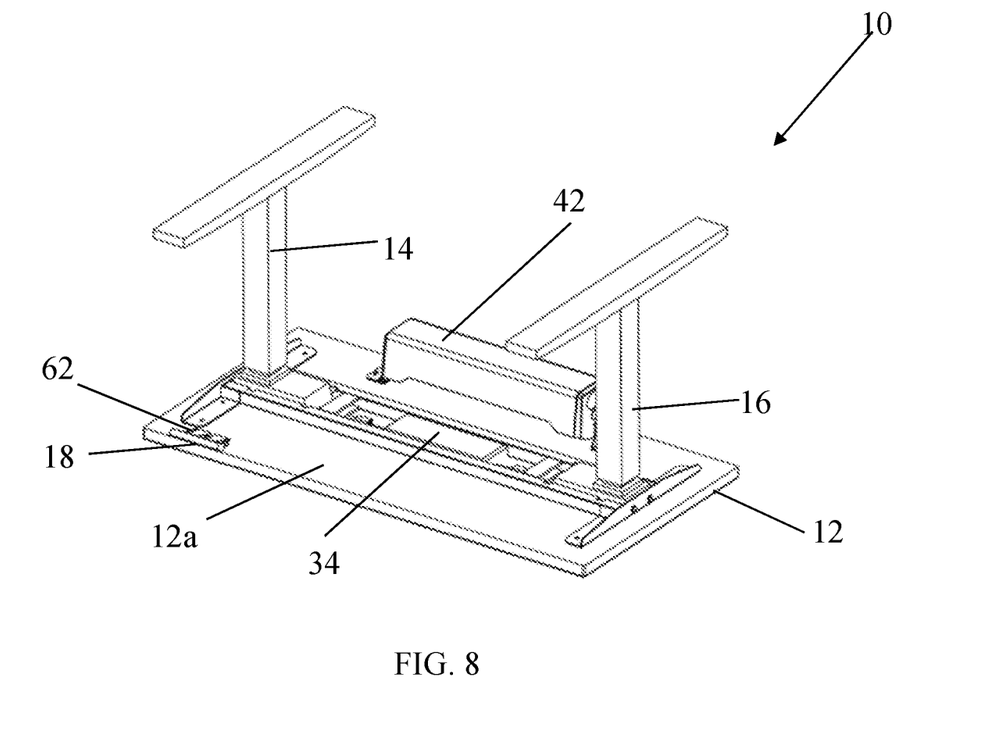
FIG. 8 is a perspective view of the bottom of the adjustable height table of FIG. 1.

Referring now to FIG. 7, after the lugs 68 of legs 14, 16 have been installed in the slots 70 and the gap between the motor housings 64, 66 and end frame members 54, 56 have been closed, holes 24 on the end frame members 54, 56 may be aligned with holes 30 on the motor housings 64, 66. Referring to FIG. 8, fasteners 32 may be inserted into the aligned holes 24 and 30 and secured by hand or with an appropriate tool. Referring back to FIG. 4B, a connection 36a from the motor 36 may be attached to a connection 34a of the power supply 34. A connection 38a from the motor 38 may be attached to a connection 34b of the power supply 34. The connections 34a, 34b, 36a, and 38a may be pig tail connectors at to cables. Alternatively, the connections 34a, 34b, 36a, and 38a may be any connection allowing for the transfer of power between the power supply 34 and the motors 36, 38. The motors 36, 38 may be other linear actuators known in the art capable of actuating the linear movement of the inner leg 14a with respect to the outer leg 14b. The table may be flipped after installation of the legs 14 and 16 such that the bases 14c and 16c are located on the floor and the table is in the upright position, as seen in FIG. 1. In the upright position, a power cable (not shown) connected to the power supply 34 may be plugged into a power source, such as a 110V or 120V outlet. Alternatively, the power supply 34 may be a battery or other known power sources.

The modular arrangement of the table 10 may allow for the table and all components of the table to be shipped in a compact manner and assembled quickly with minimal tools and connections. That is, the table 10 may be shipped with the power supply 34 and frame 20 pre-installed on the lower surface 12a of the table top 12. The legs 14, 16 may be shipped with the motors 36, 38 located in motor housings 64, 66. To assemble the table 10, a user, upon receipt of the shipped package, may quickly assemble the table 10. The user may attach the legs 14, 16 quickly via the lug 68 and slot 70 connections. Once attached, the user may then insert fasteners 32 to secure the motor housings 64, 66 to the frame 20. A tool may be provided with the shipped package to allow for tightening of the fasteners. The user may then connect the motors 36, 38 to the power supply 34 with the provided connections and flip the table to the upright position. The user may then slide the control panel 18 into the bracket 62. The assembly of the table may be quick.

With continued reference to FIGS. 7 and 8, the basket 42 may be attached to the lower surface 12a of the table top 12 with brackets 44a and 44b. Holes on the brackets 44a and 44b (FIG. 4B) may be aligned with holes on the lower surface 12a of the table top 12. Fasteners may be inserted into the aligned holes and secured by hand or with an appropriate tool.

Referring again to FIGS. 7 and 8, the control panel 18 may be connected to the power supply 34 via cable or wire (not depicted). The control panel 18 may be permanently attached or integral with the lower surface 12a of the table top 12. Alternatively, the control panel 18 may be attached to the lower surface 12a of the table top 12 with a bracket 62. The table may be flipped such that the bases 14c and 16c are located on the floor and the table 10 is in the upright position, as seen in FIG. 1. A flange on the control panel 18 may then be slid into the bracket on the lower surface 12a of the table top 12. The control panel 18 may be a user interface and may comprise buttons. The buttons may be an up arrow and a down arrow. The buttons may be configured to actuate linear movement of the inner legs 14a, 16a with respect to outer legs 14b, 16b to alter the height of the table top 12. The control panel 18 may include a display and the display may correspond to a height of the table top 12.

Although assembly is described in the aforementioned order, it will be understood that any order of assembly may be performed. For example, connection of the control panel 18 may occur prior to assembly of the legs or flipping of the table 10 to the proper orientation. Alternatively, basket 42 may be installed prior to or subsequent to the legs 14, 16 and/or control panel 18 being installed.

Although the table 10 is depicted and described as a square table, the table may take any shape, for example, the table may be rectangular, elongated, oval, elliptical, circular, polygonal, or any other shape. Additionally, the table 10 may be, for example, a desk, conference table, standing table, coffee table, console table, bistro table, bar table, outdoor table, or other type of table. The first leg 14 and second leg 16 may comprise any material capable of supporting table top 12, such as wood, plastic, metal, composite, etc. The table top 12 may comprise, for example, wood, plastic, metal, composite, laminate, stone, marble, concrete, glass, or other known materials.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

The invention claimed is:

1. A table, comprising:
 a table top including an upper surface and a lower surface;
 a frame attached to the lower surface, the frame including a power supply, a first slot, and a second slot, the frame having:
  a first lateral frame member and a second lateral frame member parallel to and spaced apart from the first lateral frame member, wherein the first lateral frame member is connected to the second lateral frame member with at least one spacer frame member;
  a first end frame member and a second end frame member, wherein the first lateral frame member and the second lateral frame member are secured at one end to the first end frame member and another end to the second end frame member;
 a first leg including a first housing, the first housing including a first lug;
 a second leg including a second housing, the second housing include a second lug; and the first slot including a first portion, a second portion, and a third portion, wherein the second portion is angled between the first portion and the third portion, wherein the first lug is adapted to engage the first slot to secure the first leg to the table top and wherein the second lug is adapted to engage the second slot to secure the second leg to the table top, wherein the first slot is oriented in a first direction, and the second slot oriented in a second direction opposite the first direction.

2. The table of claim 1, wherein the first lug is lowered into the first portion and second portion and a lateral force is applied to move the first lug from the second portion to the third portion.

3. The table of claim 1, the second slot further comprising a first portion, a second portion, and a third portion; wherein the second portion is angled between the first portion and the third portion, wherein the second lug is lowered into the first portion and second portion and a lateral force is applied to move the second lug from the second portion to the third portion.

4. The table of claim 1, wherein the first lug is located on a first side surface of the first housing and the second lug is located on a first side surface of the second housing.

5. The table of claim 4, further comprising a third lug on a second side surface of the first housing, the second side surface of the first housing opposing the first side surface of the first housing and a fourth lug on a second side surface of the second housing, the second side surface of the second housing opposing the first side surface of the second housing.

6. The table of claim 5, wherein the third lug is adapted to engage a third slot on the frame and wherein the fourth lug is adapted to engage a fourth slot on the frame.

7. The table of claim 1, wherein the first slot and the second slot are located in one of the first lateral frame member and the second lateral frame member.

8. The table of claim 7, the third portion of the first slot is disposed closer to the first end frame member than the first portion of the first slot, and the second slot further comprising a first portion, a second portion, and a third portion; wherein the third portion of the second slot is disposed closer to the second end frame member than the first portion of the second slot.

9. The table of claim 8, wherein the first housing and the first end frame member each include a hole configured to be aligned to receive a fastener to connect the first housing to the frame, when the first lug is engaged with the third portion of the first slot.

10. The table of claim 8, wherein the second housing and the second end frame member each include a hole configured to be aligned to receive a fastener to connect the second housing to the frame, when the second lug is engaged with the third portion of the second slot.

11. The table of claim 8, wherein the first and the second housing and the first and second end frame member each comprise a hole configured to be aligned to receive a fastener, when the first lug is engaged with the first slot and the second lug is engaged with the second slot.

12. The table of claim 1, the first leg and the second leg each comprising an inner member and an outer member, each inner member capable of moving linearly with respect to each outer member.

13. The table of claim 1, further comprising at least one first fastener for connecting the first housing to the frame and at least one second fastener for connecting the second housing to the frame.

14. The table of claim 1, further comprising a first motor located in the first housing and a second motor located in the second housing, wherein the first motor is adapted to linearly move the first leg and wherein the second motor is adapted to linearly move the second leg.

15. The table of claim 14, further comprising a first connection for coupling the first motor to the power supply and a second connection for coupling the second motor to the power supply.

16. A table, comprising:
a table top including an upper surface and a lower surface;
a frame attached to the lower surface, the frame including a first lateral frame member having a first slot and a third slot and a second lateral frame member having a second slot and a fourth slot, the frame further including a first end frame member and a second end frame member, wherein the first lateral frame member is connected to the second lateral frame member with at least one spacer frame member, wherein the first lateral frame member and the second lateral frame member are secured at one end to the first end frame member and another end to the second end frame member;
the first slot comprising a first portion, a second portion, and a third portion, wherein the second portion is angled between the first portion and the third portion; and
a first leg including a first lug and a second lug,
a second leg including a third lug and a fourth lug,
wherein, to secure the first leg to the table top, the first lug is adapted to engage the first slot and the second lug is adapted to engage the second slot,
wherein, to secure the second leg to the table top, the third lug is adapted to engage the third slot and the fourth lug is adapted to engage the fourth slot, and
wherein the first slot is oriented in a first direction and the third slot is oriented in a second direction opposite the first direction.

17. The table of claim 16, wherein the first lug and the second lug are located on opposing sides of the first leg.

18. The table of claim 16, further comprising a power supply located between the first lateral frame member and the second lateral frame member, wherein the first slot and the second slot are located on opposing sides of the power supply from the third slot and the fourth slot.

19. A method for assembling a table, the method comprising:
providing a table top including an upper surface and a lower surface;
attaching a frame to the lower surface of the table top, the frame including a power supply, a first slot, including a first portion, a second portion, and a third portion, wherein the second portion is angled between the first portion and the third portion, and a second slot, the frame further including a first lateral frame member, a second lateral frame member, a first end frame member, and a second end frame member, wherein the first lateral frame member is connected to the second lateral frame member with at least one spacer frame member, wherein the first lateral frame member and the second lateral frame member are secured at one end to the first end frame member and another end to the second end frame member, wherein the first slot is oriented in a first direction, and the second slot oriented in a second direction opposite the first direction;
attaching a first leg to the frame by guiding a first lug on a first housing of the first leg into the first slot;

attaching a second leg to the frame by guiding a second lug on a second housing of the second leg into the second slot;
providing a first motor in the first housing and a second motor in the second housing;
attaching a first power connection from the power supply to a first motor connection from the first motor; and
attaching a second power connection from the power supply to a second motor connection from the second motor.

20. The method of claim 19, wherein attaching the first leg further comprises guiding a third lug on the first housing of the first leg into a third slot on the frame, and wherein attaching the second leg further comprises guiding a fourth lug on the second housing of the second leg into a fourth slot on the frame.

21. The method of claim 20, further comprising simultaneously guiding the first lug into the first slot and the third lug into the third slot to secure the first leg to the table top and simultaneously guiding the second lug into the second slot and the fourth lug into the fourth slot to secure the second leg to the table top.

\* \* \* \* \*